UNITED STATES PATENT OFFICE.

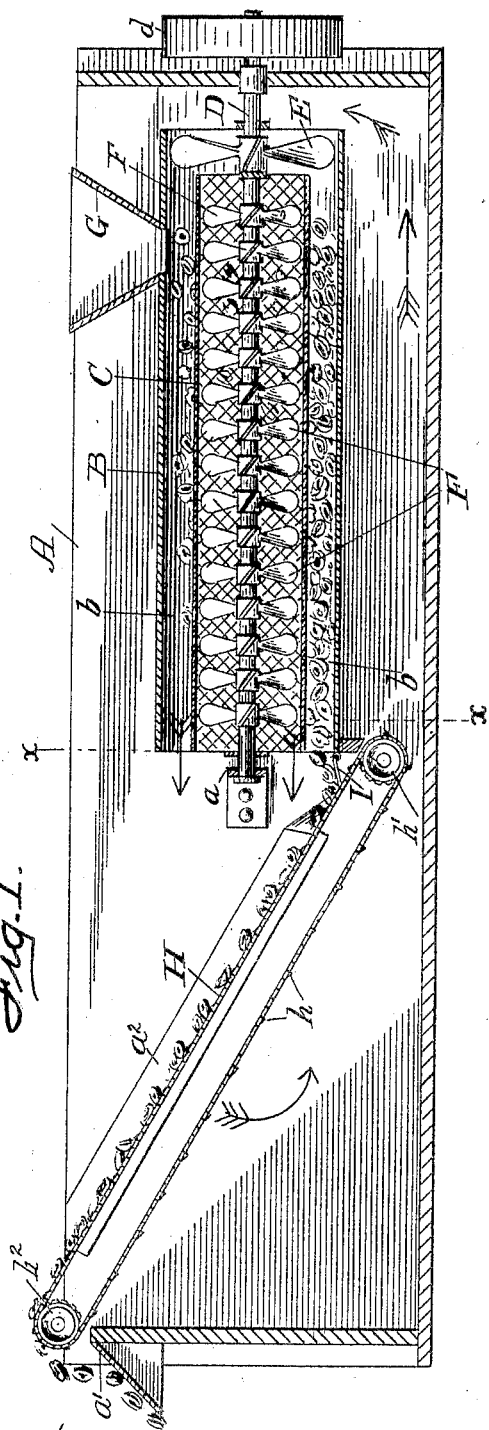
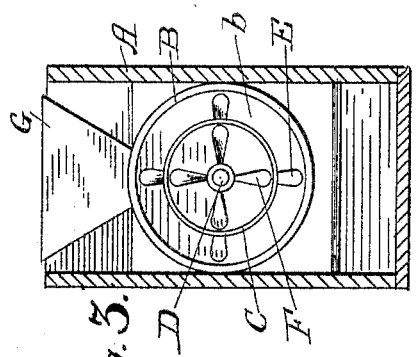
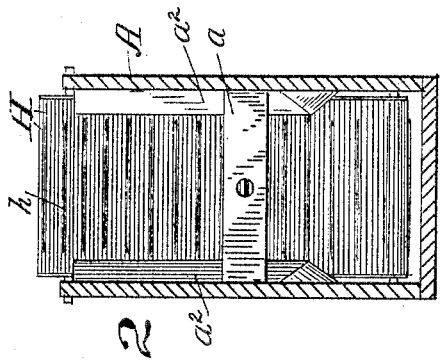

ANTONIO CERRUTI, OF SAN FRANCISCO, CALIFORNIA.

FRUIT-WASHER.

No. 797,171.  Specification of Letters Patent.  Patented Aug. 15, 1905.

Application filed August 4, 1904. Serial No. 219,442.

*To all whom it may concern:*

Be it known that I, ANTONIO CERRUTI, a citizen of the United States, residing in the city and county of San Francisco, State of California, have invented certain new and useful Improvements in Fruit-Washers; and I do hereby declare the following to be a full, clear, and exact description of the same.

My invention relates to the class of fruit-washers.

In the preparation of fruit, particularly peaches, for canning it has become customary to remove the skin of the fruit by a process which involves the initial step of subjecting the fruit to a skin-disintegrating solution, usually a solution of caustic soda, and a succeeding step of removing by a variety of means the disintegrated skin. In the various apparatuses employed for carrying out this process the means for removing the disintegrated skin is in some instances a series of brushes, in others a wiping device, and in still others water is used.

My present invention particularly relates to that part of the skin-removing apparatus in which the fruit is subjected to the action of water.

The object of my invention is to provide a simple and effective device for removing the disintegrated skin of the fruit by the forcible contact or agitation of water produced by means which will not injure the fruit while passing through the machine and which will effect an economical use of the water.

To this end my invention consists in the novel construction, combinations, and arrangement of parts which I shall now fully describe.

Referring to the accompanying drawings, Figure 1 is a longitudinal vertical section of my machine. Fig. 2 is a cross-section on the line $x\ x$ of Fig. 1 looking toward the left or discharge end of the machine. Fig. 3 is a cross-section on the same line looking toward the right or feed end of the machine.

A is a tank of suitable proportions and capacity and adapted to hold water. Within this tank at one end is suitably supported an open-ended stationary outer vessel, here shown in the form of a cylinder B, which as, shown in Fig. 3, is as wide as the interior of the tank, but is separated from the bottom of the tank. Within this outer vessel is an inner stationary vessel, here shown in the form of a cylinder C, sufficiently smaller than the outer cylinder to leave an intervening space $b$ of sufficient size to permit the ready passage of the fruit. The cylinder C is also an open-ended one and is made of open-work or screen material, as seen in Fig. 1. Passing through the axis of cylinder C is a shaft D, mounted at one end in the tank end and at the inner end in a cross-bar $a$, secured in the tank. The shaft D is adapted to be rotated by any suitable means, as by the pulley $d$ on its outer end, Fig. 1. Upon this shaft is mounted a propeller E, consisting of suitably-arranged blades, said propeller being located within one end of the cylinder B, as shown in Fig. 1, and substantially of the same diameter as said end. Upon the shaft D, within the inner or screen cylinder C, are secured propellers F in any suitable number.

G is a feed-hopper communicating with the top of the outer cylinder B, near one end, and adapted to supply the fruit to the space $b$ between the two cylinders.

H is a traveling conveyer of any suitable perforated or open character—such as a slatted conveyer, as shown—said conveyer having cross-cleats $h$, as seen in Fig. 2. It is mounted at one end within the tank A upon sprocket $h'$ and lies immediately under the end of the fruit-space $b$. The conveyer extends upwardly to the discharge end of the tank to a sprocket $h^2$, where it delivers the fruit to an apron $a'$. It is driven by suitable mechanism unnecessary herein to show. A hinged apron I extends from the discharge end of the outer cylinder B and lies upon the conveyer, being adapted to pass the fruit from the space $b$ to the conveyer. The sides of tank A are provided with guards $a^2$, which overlap the conveyer, as seen in Fig. 2, and confine the fruit upon it.

The operation of the machine is as follows: Water is supplied to the tank by any suitable means and freshened as required by means of any suitable inlet and overflow. The fruit, as is indicated in Fig. 1, is delivered from the hopper G into the space $b$, the skin of the fruit having been previously disintegrated, as heretofore mentioned. The shaft D being rotated, the propellers E and F force the water forward through the annular space $b$ between the two cylinders and through the inner screen-cylinder into the forward end of the tank, said water returning in the bottom of the tank in the space between said bottom and the outer cylinder, as indicated by the arrows. The conveyer interferes but little, if at all, with this circulation of the water;

but said conveyer intercepts and receives the fruit which by the forward flow or current of water is carried to the discharge end of the space $b$ and passes over the apron I to the conveyer by which, held by the cross-cleats $h$, it is elevated and removed from the machine. The current thus produced is not only sufficient to carry the fruit forward to the conveyer, but is of sufficient intensity and of such force as to create a violent churning and agitation of the water, which has the effect of removing effectively the disintegrated skin from the advancing fruit. The propellers or paddles F, inclosed within the screen-cylinder C, are out of the way of and cannot injure the fruit.

Having thus described my invention, what I claim as new, and desire to secure by Letters Patent, is—

1. A fruit-washer comprising a water-tank, a vessel supported within one end of the tank, a second vessel of screen material within the first-named vessel and separated therefrom to leave a space between them, means for supplying the fruit to said intervening space near one end, a rotary shaft passing through the axis of the inner vessel, a propeller on said shaft within the rear end of the outer vessel, and propellers on said shaft within the inner vessel, for effecting a circulation of the water in the tank forwardly through said vessels toward the opposite end of the tank.

2. A fruit-washer comprising a water-tank, a vessel supported within one end of the tank, a second vessel of screen material within the first-named vessel and separated therefrom to leave a space between them, means for supplying the fruit to said intervening space near one end, a rotary shaft passing through the axis of the inner vessel, a propeller on said shaft within the rear end of the outer vessel, propellers on said shaft within the inner vessel for effecting a circulation of the water in the tank forwardly through said vessels toward the opposite end of the tank, and a traveling conveyer in said last-named end of the tank disposed to receive the fruit from the space between the two vessels, and to discharge it from the tank.

3. A fruit-washer comprising a relatively long water-tank, a relatively short open-ended vessel mounted within said tank at one end, said vessel occupying the width of the tank and separated from the tank-bottom, a second open-ended vessel formed of screen material mounted within the first-named vessel and separated therefrom to leave an intervening space, means for supplying the fruit to said space near one end, means for effecting a circulation of the water forward through the vessels toward the opposite end of the tank and backward under the outer vessel to the first end of the tank, and a traveling conveyer within said opposite end of the tank to receive the fruit from the space between the vessels and discharge it from the tank.

4. A fruit-washer comprising a water-tank, an open-ended vessel mounted within said tank at one end, said vessel occupying the width of the tank and separated from the tank-bottom, a second open-ended vessel of screen material mounted within the first-named vessel and separated therefrom to leave an intervening space, means for supplying the fruit to said space near one end, a rotary shaft passing through the axis of the inner vessel and propellers on said shaft within said vessels to effect a circulation of the water forward through said vessels toward the opposite end of the tank and backward under the outer vessel to the first end of the tank.

5. A fruit-washer comprising a water-tank, an open-ended vessel mounted within said tank at one end, said vessel occupying the width of the tank and separated from the tank-bottom, a second open-ended vessel of screen material mounted within the first-named vessel and separated therefrom to leave an intervening space, means for supplying the fruit to said space near one end, a rotary shaft passing through the axis of the inner vessel, propellers on said shaft within said vessels to effect a circulation of the water forward through said vessels toward the opposite end of the tank and backward under the outer vessel to the first end of the tank, and a traveling conveyer in the tank to receive the fruit from the space between the vessels and discharge it from the tank.

In witness whereof I have hereunto set my hand.

ANTONIO CERRUTI.

Witnesses:
WALTER F. VANE,
D. B. RICHARDS.